(12) United States Patent
Park et al.

(10) Patent No.: US 10,885,636 B2
(45) Date of Patent: Jan. 5, 2021

(54) OBJECT SEGMENTATION APPARATUS AND METHOD USING GAUSSIAN MIXTURE MODEL AND TOTAL VARIATION

(71) Applicant: Electronics and Telecommunications Research Institute, Daejeon (KR)

(72) Inventors: Seong Jin Park, Seoul (KR); Do Hyung Kim, Sejong-si (KR); Jae Woo Kim, Daejeon (KR); Seong Jun Bae, Daejeon (KR); Ho Wook Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 137 days.

(21) Appl. No.: 16/181,144

(22) Filed: Nov. 5, 2018

(65) Prior Publication Data

US 2019/0139228 A1    May 9, 2019

(30) Foreign Application Priority Data

Nov. 7, 2017  (KR) .................. 10-2017-0147474
Oct. 5, 2018  (KR) .................. 10-2018-0119053

(51) Int. Cl.
*G06T 7/11*     (2017.01)
*G06T 7/194*    (2017.01)
*G06T 7/143*    (2017.01)

(52) U.S. Cl.
CPC .............. *G06T 7/194* (2017.01); *G06T 7/11* (2017.01); *G06T 7/143* (2017.01);
(Continued)

(58) Field of Classification Search
CPC . G06T 7/194; G06T 7/143; G06T 7/11; G06T 2207/10024; G06T 2207/20096; G06T 2207/20104; G06T 2207/30201
See application file for complete search history.

(56) References Cited

U.S. PATENT DOCUMENTS 6,973,212 B2    12/2005   Boykov et al.
7,831,087 B2 *  11/2010   Harville ............. G06K 9/00228
                                                            382/154
(Continued)

FOREIGN PATENT DOCUMENTS

KR        101014296 B1    2/2011
KR      1020150024719 A    3/2015

OTHER PUBLICATIONS

Markus Unger et al., "TVSeg—Interactive Total Variation Based Image Segmentation," BMVC 2008 doi:10.5244/C.22.40, p. 1-10.

*Primary Examiner* — Gregory M Desire
(74) *Attorney, Agent, or Firm* — William Park & Associates Ltd.

(57) ABSTRACT

Disclosed is an apparatus and method of segmenting an object. An object segmentation method according to the present disclosure includes: receiving an input image; receiving a user input indicating at least one piece of information on a foreground region and a background region included in the input image; generating at least one among a foreground pixel list and a background pixel list using the received user input; calculating Gaussian distribution of at least one pixel that makes up the input image using at least one among the generated foreground pixel list and background pixel list; and determining whether the at least one pixel is a foreground pixel or a background pixel using the calculated Gaussian distribution.

14 Claims, 3 Drawing Sheets

(52) U.S. Cl.
CPC ............... *G06T 2207/10024* (2013.01); *G06T 2207/20096* (2013.01); *G06T 2207/20104* (2013.01); *G06T 2207/30201* (2013.01)

(56) References Cited

U.S. PATENT DOCUMENTS

| | | | |
|---|---|---|---|
| 7,916,944 B2 * | 3/2011 | Yang | G06T 7/136 |
| | | | 382/173 |
| 8,565,525 B2 * | 10/2013 | Rossato | G06K 9/38 |
| | | | 382/173 |
| 8,682,063 B2 * | 3/2014 | Wang | G06K 9/6278 |
| | | | 382/164 |
| 9,152,243 B2 * | 10/2015 | Gu | G06K 9/6242 |
| 9,478,040 B2 * | 10/2016 | Jumpasut | G06T 7/162 |
| 9,704,261 B2 * | 7/2017 | Ji | G06T 7/136 |
| 10,235,761 B2 * | 3/2019 | Jumpasut | G06T 7/194 |
| 2015/0242703 A1 | 8/2015 | Lee et al. | |
| 2017/0278246 A1 | 9/2017 | Kim | |
| 2019/0139228 A1 * | 5/2019 | Park | G06T 7/194 |

\* cited by examiner

OBJECT SEGMENTATION APPARATUS AND METHOD USING GAUSSIAN MIXTURE MODEL AND TOTAL VARIATION

CROSS REFERENCE TO RELATED APPLICATION

The present application claims priority to Korean Patent Application Nos. 10-2017-0147474, and 10-2018-0119053 filed Nov. 7, 2017, and Oct. 5, 2018 the entire contents of which is incorporated herein for all purposes by this reference.

BACKGROUND OF THE INVENTION

Field of the Invention

The present disclosure relates generally to an object segmentation apparatus and method using a Gaussian mixture model and a total variation. More particularly, the present disclosure relates to an apparatus and method of segmenting an object by using a Gaussian model and a total variation, on the basis of information on a foreground and a background in an input image, which is obtained from a user.

Description of the Related Art

Object segmentation is an operation of segmenting an object that, a user requires in an arbitrary image. For object segmentation, first, it is required to obtain, from the user, information on which object to be segmented or which region not to be segmented. That is, it is necessary to obtain, from the user, information on a foreground required to be segmented or a background required not to be segmented. However, if this process is performed in too much detail, it is not user-friendly and it is meaningless to develop a segmentation algorithm.

In conventional object segmentation methods, generally, on the basis of color or brightness values of pixels indicated by the user, it is determined whether the remaining pixels not indicated by the user are the foreground or the background. Specifically, by using an average color or brightness value of the foreground pixels indicated by the user and an average color or brightness value of the background pixels indicated by the user, it is determined whether the color or brightness of the remaining pixels is close to the foreground or background. Then, a smoothing process is performed on the basis of the determination result, and whether the relevant pixel is the foreground or background is finally determined.

However, regarding a method in which an average value of color is used as a representative value on the basis of information indicated by the user, while it is likely that for foreground objects, color values of the objects are similar to each other, it is rare for the background to have a single color or similar colors in an actual image. Therefore, unless it is a particular situation, the average color value of the background pixels does not represent the background. Of course, a distribution value may be used rather than simply the average color value is used. However, the distribution value for the background is large, and the large distribution value does not provide meaningful information in an object segmentation process. Also, when there are various colors in a portion indicated as the foreground, the average color does not represent the foreground. That is, as an extreme example, when only black and white colors are present in the foreground, grey color which is the average thereof represents the foreground. In this case, it is impossible to properly separate the foreground.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keep in mind the above problems occurring in the related art, and the present disclosure is intended to propose an object segmentation apparatus and method using a Gaussian mixture model and a total variation.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided an object segmentation method including: receiving an input image; receiving a user input indicating at least one piece of information on a foreground region and a background region included in the input image; generating at least one among a foreground pixel list and a background pixel list using the received user input; calculating Gaussian distribution of at least one pixel that makes up the input image using at least one among the generated foreground pixel list and background pixel list; and determining whether the at least one pixel is a foreground pixel or a background pixel using the calculated Gaussian distribution.

In the object segmentation method according to the present disclosure, the method may further include finally determining whether the at least one pixel is the foreground pixel or the background pixel by performing total variation smoothing on at least one pixel that is determined as the foreground pixel or the background pixel.

In the object segmentation method according to the present disclosure, the user input may include at least one among information on touching a display unit, which displays the input image, and coordinate information on a predetermined pixel in the input image.

In the object segmentation method according to the present disclosure, the foreground pixel list may include at least one among coordinates, a brightness value, and a color value of at least one pixel indicated as the foreground region by the user input, and the background pixel list may include at least one among coordinates, a brightness value, and a color value of at least one pixel indicated as the background region by the user input.

In the object segmentation method according to the present disclosure, the calculating of the Gaussian distribution of the at least one pixel that makes up the input image may include calculating the Gaussian distribution of the at least one pixel included in one of the foreground pixel list and the background pixel list.

In the object segmentation method according to the present disclosure, at the calculating of the Gaussian distribution, the at least one pixel may be used regarding an average value and all pixels included in one list, which includes the at least one pixel, between the foreground pixel list and the background pixel list may be used regarding a distribution value.

In the object segmentation method according to the present disclosure, the determining of whether the at least one pixel is the foreground pixel or the background pixel may include calculating a foreground probability or a background probability of at least one pixel that is not included in the foreground pixel list and the background pixel list.

In the object segmentation method according to the present disclosure, the foreground probability may be subjected to a predetermined weight factor inversely proportional to distance between a pixel included in the foreground pixel list and the at least one pixel that is not included in the foreground pixel list and the background pixel list.

In the object segmentation method according to the present disclosure, the background probability may be subjected to a predetermined weight factor inversely proportional to a distance between a pixel included in the background pixel list and the at least one pixel that is not included in the foreground pixel list and the background pixel list.

In the object segmentation method according to the present disclosure, the at least one among the generated foreground pixel list and background pixel list may be a list of pixels in order of the received user input.

Also, according to another aspect at the present disclosure, there is provided an object segmentation apparatus including: a foreground/background pixel list generation unit configured to: receive an input image; receive a user input indicating at least one piece of information on a foreground region and a background region included in the input image; and generate at least one among a foreground pixel list and a background pixel list using the received user input; and a Gaussian mixture model-based foreground/background preprocessing segmentation unit configured to: calculate Gaussian distribution of at least one pixel that makes up the input image using at least one among the generated foreground pixel list and background pixel list; and determine whether the at least, one pixel is a foreground pixel of a background pixel using the calculated Gaussian distribution.

In the object segmentation apparatus according to the present disclosure, the apparatus may further include a total variation smoothing-based foreground/background final segmentation unit finally determining whether the at least one pixel is the foreground pixel or the background pixel by performing total variation smoothing on at least one pixel that is determined as the foreground pixel or the background pixel.

In the object segmentation apparatus according to the present disclosure, the user input may include at least one among information on touching a display unit, which displays the input image, and coordinate information on a predetermined pixel in the input image.

In the object segmentation apparatus according to the present disclosure, the foreground pixel list may include at least one among coordinates, a brightness value, and a color value of at least one pixel indicated as the foreground region by the user input, and the background pixel list may include at least one among coordinates, a brightness value, and a color value of at least one pixel indicated as the background region by the user input.

In the object segmentation apparatus according to the present disclosure, the Gaussian mixture model-based foreground/background preprocessing segmentation unit may calculate the Gaussian distribution of the at least one pixel included in one of the foreground pixel list and the background pixel list.

In the object segmentation apparatus according to the present disclosure, at the calculating of the Gaussian distribution, the at least one pixel may be used regarding an average value and all pixels included in one list, which includes the at least one pixel, between the foreground pixel list and the background pixel list may be used regarding a distribution value.

In the object segmentation apparatus according to the present disclosure, the Gaussian mixture model-based foreground/background preprocessing segmentation unit may calculate a foreground probability or a background probability of at least one pixel that is not included in the foreground pixel list and the background pixel list.

In the object segmentation apparatus according to the present disclosure, the foreground probability may be subjected to a predetermined weight factor inversely proportional to a distance between a pixel included in the foreground pixel list and the at least one pixel that is not included in the foreground pixel list and the background pixel list.

In the object segmentation apparatus according to the present disclosure, the background probability may be subjected to a predetermined weight factor inversely proportional to a distance between a pixel included in the background pixel list and the at least one pixel that is not included in the foreground pixel list and the background pixel list.

In the object segmentation apparatus according to the present disclosure, at least one among the generated foreground pixel list and background pixel list may be a list of pixels in order of the received user input.

It is to be understood that the foregoing summarized features are exemplary aspects of the following detailed description of the present disclosure without limiting the scope of the present disclosure.

According to the present disclosure, there is provided an object segmentation apparatus and method using a Gaussian mixture model and a total variation.

Also, according to the present disclosure, there is provided an object segmentation apparatus and method based on information on a foreground and a background in a color image, which is obtained from a user, using a Gaussian model and a total variation.

Also, according to the present disclosure, there is provided an object segmentation apparatus and method of separating a foreground and a background by applying a large weight factor to similarity with the color of a foreground or background pixel close to a current pixel and applying a small weight factor to similarity with the color of the pixel far from the current pixel.

Also, according to the present disclosure, there is provided the apparatus and method of applying a total variation smoothing technique to remove noise and keeping the contour clear while providing the smooth segmentation result with respect to the remaining regions.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
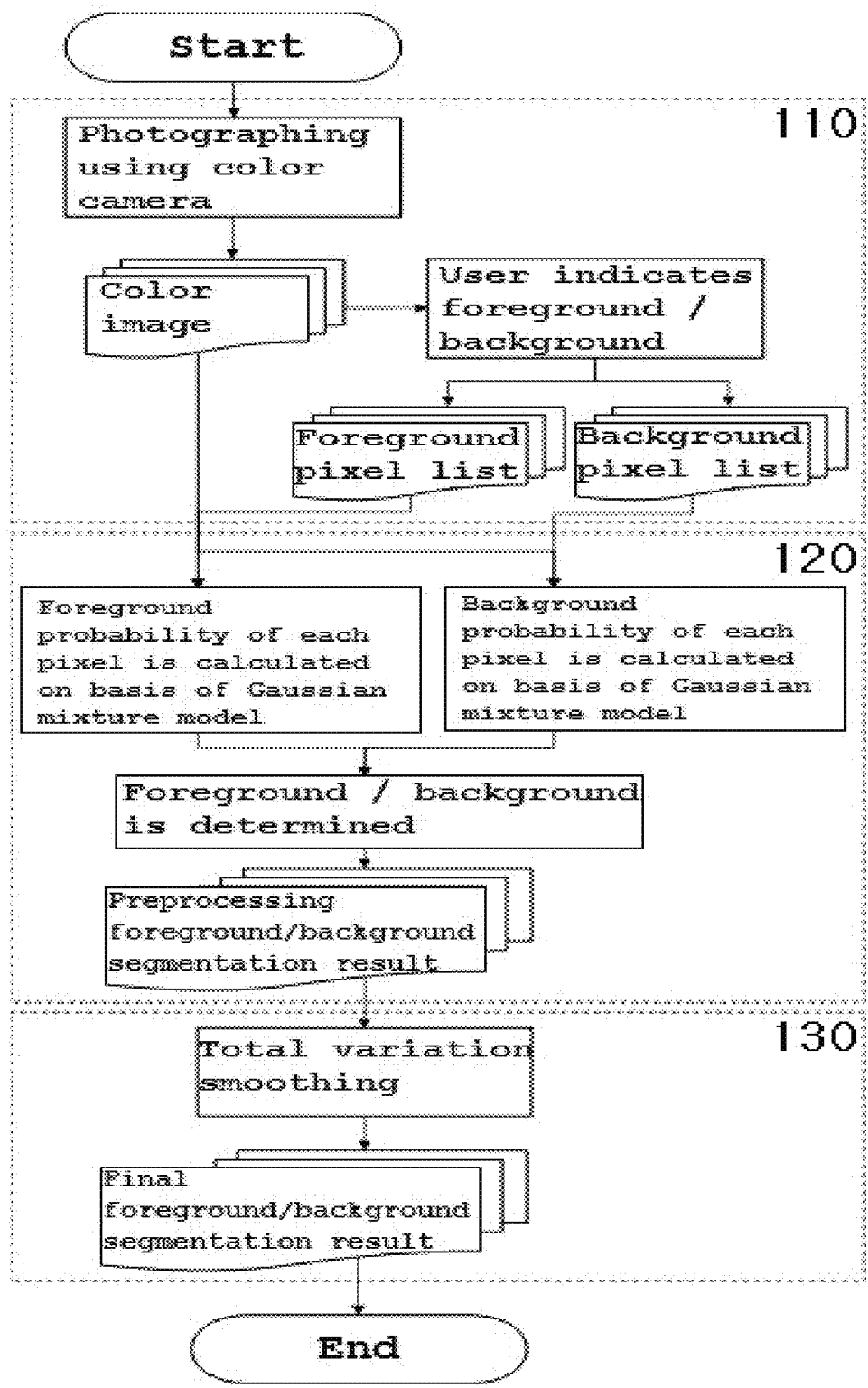
FIG. 1 is a block diagram illustrating configuration of an object segmentation apparatus according to an embodiment of the present disclosure.

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second" etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Herein below, exemplary embodiments of the present disclosure will be described with reference to the accompanying drawings.

FIG. 1 is a block diagram illustrating configuration of an object segmentation apparatus according to an embodiment of the present disclosure.

Referring to FIG. 1, the object segmentation apparatus may include a foreground/background pixel list generation unit 110, a Gaussian mixture model-based foreground/background preprocessing segmentation unit 120, and/or a total variation smoothing-based foreground/background final segmentation unit 130. It is noted that only some elements required to explain the embodiment are described and the elements included in the apparatus according to the present disclosure are not limited to the above-described examples. For example, two or more constituents may be implemented in a single constituent, and an operation performed in one constituent may be implemented in such a manner to be divided and performed by two or more constituents. Also, some constituents may be omitted or additional constituents may be added.

The foreground/background pixel list generation unit 110 may obtain an image using a camera. The obtained image may be a color image. For example, the foreground/background pixel list generation unit 110 may obtain a color image using a color camera. Also, the foreground/background pixel list generation unit 110 may set the obtained image as an input image and may receive information on a foreground and a background in the input image from a user. Also, the foreground/background pixel list generation unit 110 may indicate the foreground or background or both on the input image using the user input. Also, the foreground/background pixel list generation unit 110 may indicate an inside of a region in which an object that the user requires is present by using the user input. The user input may include information on whether an arbitrary pixel in the input image is the foreground or the background, which may be, for example, information on touching a display unit, which displays the input image, coordinate information on a predetermined pixel, or the like. Also, for example, in order to indicate the foreground or the background or both on the input image, a stroke tool, a pen tool, a brush tool, or the like may be used.

In the present disclosure, the foreground/background pixel list generation unit 110 may generate a list using the pixels indicated by the user in the color image, which is called a foreground pixel list. For example, the foreground/background pixel list generation unit 110 may generate a list of pixels in predetermined order. Also, for example, the foreground pixel list may store pixel coordinates of pixels indicated as the foreground, and/or a color value or a brightness value of the relevant pixel. Also, for example, background pixel list may store pixel coordinates of pixels indicated as the background, and/or a color value or a brightness value of the relevant pixel. Also, the foreground/background pixel list generation unit 110 may indicate a portion around an object that the user requires in the input image. Here, the foreground/background pixel list generation unit 110 may indicate the object which the user requires in such a manner as not to be included, and a stroke tool, a pen tool, a brush tool, or the like may be used. Also, in the present disclosure, the foreground/background pixel list generation unit 110 may generate a list using pixels around the object which the user requires, which may be called a background pixel list or a background mask. For example, the foreground/background pixel list generation unit 110 may generate a list of pixels in order of indication in the input image by the user.

Figure 2:
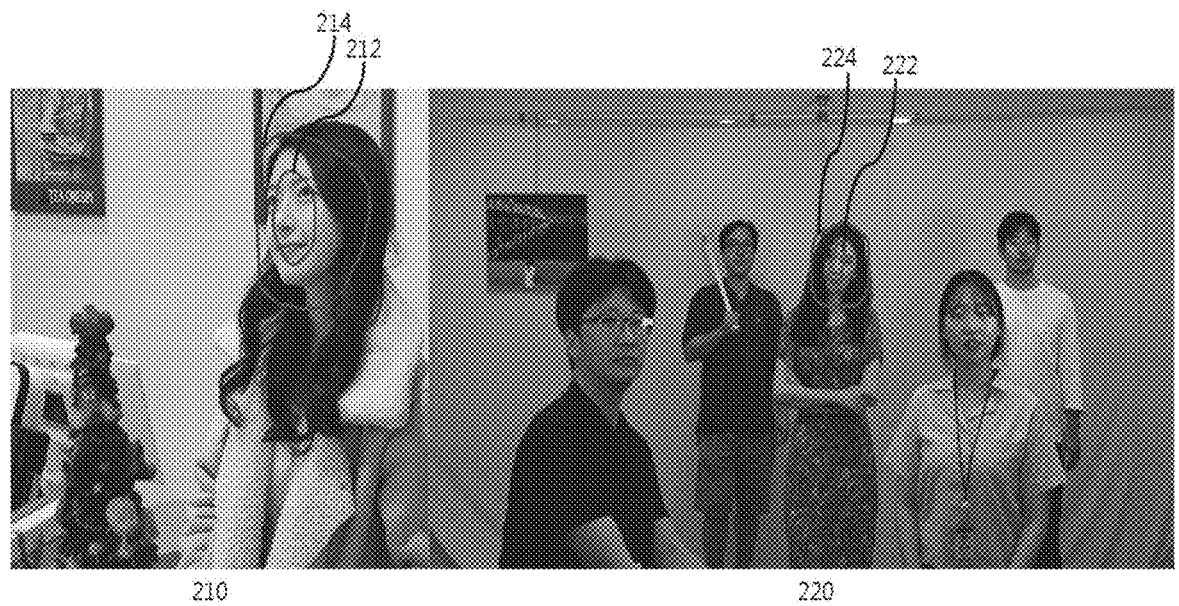
FIG. 2 is a diagram illustrating an image in which a foreground and a background are indicated by a user input according to an embodiment of the present disclosure.

FIG. 2 is a diagram illustrating an image in which a foreground and a background are indicated by a user input according to an embodiment of the present disclosure.

Referring to FIG. 2, the foreground/background pixel list generation unit 110 may perform a series of processes in order to separate the object the user requires. For example, the foreground/background pixel list generation unit 110 may indicate a first stroke 212 to separate the face of the female model in a first image 210 as a foreground, and may indicate a second stroke 214 to classify the hair, neck portions, and the like around the face of the female model as a background. Also, the foreground/background pixel list generation unit 110 may generate a foreground pixel list using the pixels included in the first stroke 212. Also, the foreground/background pixel list generation unit 110 may generate a background pixel list using the pixels included in the second stroke 214.

Also, the foreground/background pixel list generation unit 110 may indicate a first stroke 222 to separate the face of the female model in a second image 220 as a foreground, and may indicate a second stroke 224 to classify the hair, neck portions, and the like around the face of the female model as a background.

Referring back to FIG. 1, the Gaussian mixture model-based foreground/background preprocessing segmentation unit 120 may calculate, using Gaussian mixture model, a foreground probability or a background probability or both of the pixel in which information on the foreground or the background is not present. For example, the Gaussian mixture model-based foreground/background preprocessing segmentation unit 120 may calculate the foreground probability or the background probability or both of each pixel which is not indicated by the user. Also, the Gaussian mixture model-based foreground/background preprocessing segmentation unit 120 may determine whether the pixel corresponds to the foreground or the background using the calculated foreground probability or background probability or both. Also, the Gaussian mixture model-based foreground/background preprocessing segmentation unit 120 may obtain the result of preprocessing foreground/background segmentation using the result of determination.

In the present disclosure, the Gaussian mixture model-based foreground/background preprocessing segmentation unit 120 may generate Gaussian distribution with respect to each pixel included in each list using the foreground pixel list and the background pixel list generated by the foreground/background pixel list generation unit 110. For example, when generating Gaussian distribution with respect to foreground pixels, the color value of the current pixel is used regarding an average and distribution of all pixels in the foreground pixel list is used regarding distribution. Also, example, when generating Gaussian distribution with respect to background pixels, the color value of the current pixel is used regarding an average and distribution of all pixels in the background pixel list is used regarding distribution.

Also, the Gaussian mixture model-based foreground/background preprocessing segmentation unit 120 may calculate a probability that whether each pixel is a foreground pixel or a background pixel with respect to the remaining pixels which are not included in the foreground pixels and background pixels. For example, the Gaussian mixture model-based foreground/background preprocessing segmentation unit 120 may calculate a probability value in Gaussian distribution of each foreground pixel with respect to the remaining pixels. Also, by adding all probability values multiplied by a weight factor inversely proportional to a distance value between the current pixel and the foreground pixel in which the probability value in Gaussian distribution is calculated, the probability that the current pixel is the foreground pixel may be calculated. By a process similar to the process of calculating the probability that the current pixel is the foreground pixel, calculated is a probability that the remaining pixels, which are not included in the foreground pixels and background pixels, correspond to the background pixels. The probability that the current pixel is the foreground pixel may be expressed as Equation 1. Also, the probability that the current pixel is the background pixel may be expressed as Equation 2.

$$F(x) = \sum_{i=1}^{F_N} \frac{1}{dist(x, f_i)} \times \frac{\exp\left(-\frac{1}{2}(C(x) - C(f_i))^T D_F^{-1}(C(x) - C(f_i))\right)}{\sqrt{(2\pi)^k |D_F|}}$$ [Equation 1]

$$B(x) = \sum_{i=1}^{B_N} \frac{1}{dist(x, b_i)} \times \frac{\exp\left(-\frac{1}{2}(C(x) - C(b_i))^T D_B^{-1}(C(x) - C(b_i))\right)}{\sqrt{(2\pi)^k |D_B|}}$$ [Equation 2]

In Equation 1, F(x) may denote the probability that the current pixel x is the foreground pixel, and in Equation 2, B(x) may denote the probability that the current pixel x is the background pixel. In Equation 1, $F_N$ may denote the number of pixels within the foreground pixel list, and in Equation 2, $B_N$ may denote the number of pixels within the background pixel list. In Equation 1, $dist(x, f_i)$ may denote the distance between the current pixel and the i-th foreground pixel, and in Equation 2, $dist(x, b_i)$ may denote the distance between the current pixel and the i-th background pixel. In Equations 1 and 2, C(x) may denote the color value of the current pixel. In Equation 1, $C(f_i)$ may denote the color value of the i-th foreground pixel, and in Equation 2, $C(b_i)$ may denote the color value of the i-th background pixel. In Equation 1, $D_F$ may denote distribution of all pixels within the foreground pixel list, and in Equation 2, $D_B$ may denote distribution of all pixels within the background pixel list. In the case of color, all three channels R, G, and B are used, so that distribution values may be expressed in a 3×3 matrix rather than a single value. After the foreground probability and background probability of each pixel are calculated, a final foreground probability may be calculated through a normalization process shown in Equation 3. For example, when the foreground probability exceeds 0.5, classification as the foreground is possible.

$$O(x) = \frac{F(x)}{F(x) + B(x)}$$ [Equation 3]

In Equation 3, O(x) may denote the final foreground probability.

Figure 3:
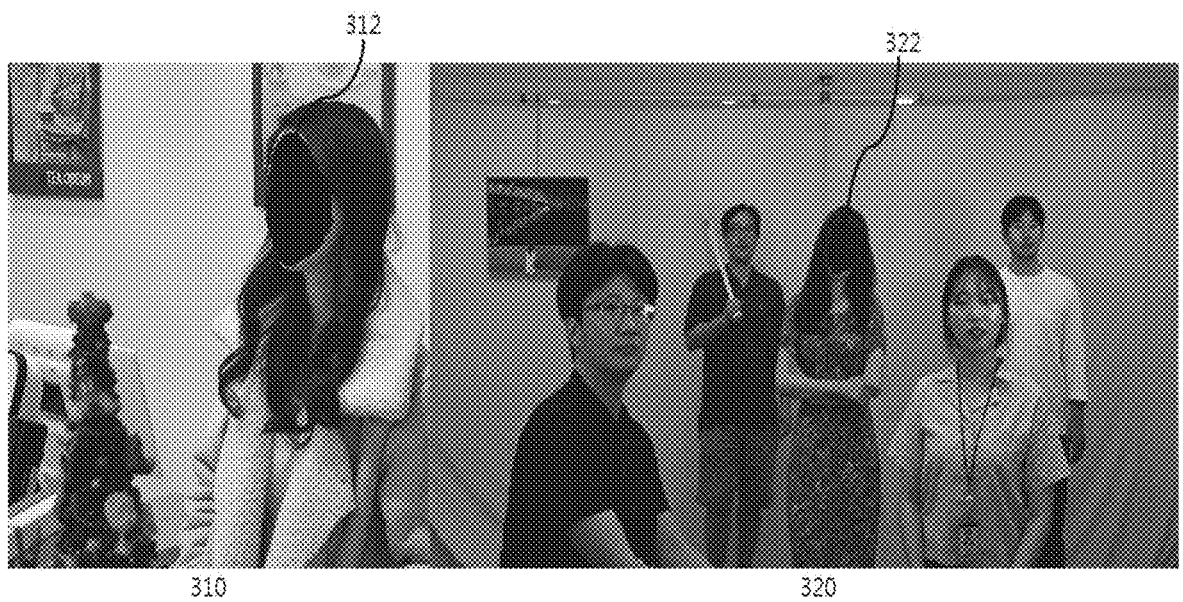
FIG. 3 is a diagram illustrating an image in which a foreground and a background are segmented using a Gaussian mixture model according to an embodiment of the present disclosure.

FIG. 3 is a diagram illustrating an image in which the foreground and the background are segmented using the Gaussian mixture model according to an embodiment of the present disclosure.

A first image 310 shown in FIG. 3 is an image obtained by segmenting a foreground 312 and the background in the first image 210 shown in FIG. 2. The background in the first image 310 may mean a region excluding the foreground 312 in the first image 310. A second image 320 shown in FIG. 3 is an image obtained by segmenting a foreground 322 and the background in the second image 220 shown in FIG. 2. The background in the second image 320 may mean a region excluding the foreground 322 in the second image 320. Referring to FIG. 3, the result of the current pixel is calculated independently of the results of the adjacent pixels, and thus the result may be particularly sensitive to noise or accuracy with which the foreground and the background are segmented may degrade. For example, the Gaussian mixture model-based foreground/background preprocessing segmentation unit may segment the foreground and the background using foreground and background information indicated in FIG. 2, and the segmentation result may have slight noise or may be slightly inaccurate.

Referring back to FIG. 1, the total variation smoothing-based foreground/background final segmentation unit 130 may perform total variation smoothing using the result of preprocessing foreground/background segmentation obtained by the Gaussian mixture model-based foreground/background preprocessing segmentation unit 120. Also, the total variation smoothing-based foreground/background final segmentation unit 130 may finally obtain the result image in which the foreground and the background are segmented on the basis of the total variation smoothing.

In the present disclosure, the total variation smoothing-based foreground/background final segmentation unit may perform smoothing on the result obtained by the Gaussian mixture model-based foreground/background preprocessing segmentation unit. The result on which smoothing is performed may be the segmentation result that more noise is removed and the foreground region is softer and more natural, compared with the result obtained by the Gaussian mixture model-based foreground/background preprocessing segmentation unit. Total variation smoothing may be performed by finding E(x), which minimizes an energy function, shown in Equation 4.

$$\text{Energy} = \frac{1}{2} \sum_x (E(x) - O(x))^2 + \lambda |\nabla E(x)|$$ [Equation 4]

Referring to Equation 4, E(x), which minimizes the energy function, defined in Equation 4 may be the final foreground probability. For example, when the final foreground probability exceeds 0.5, classification as the foreground is finally possible.

Figure 4:
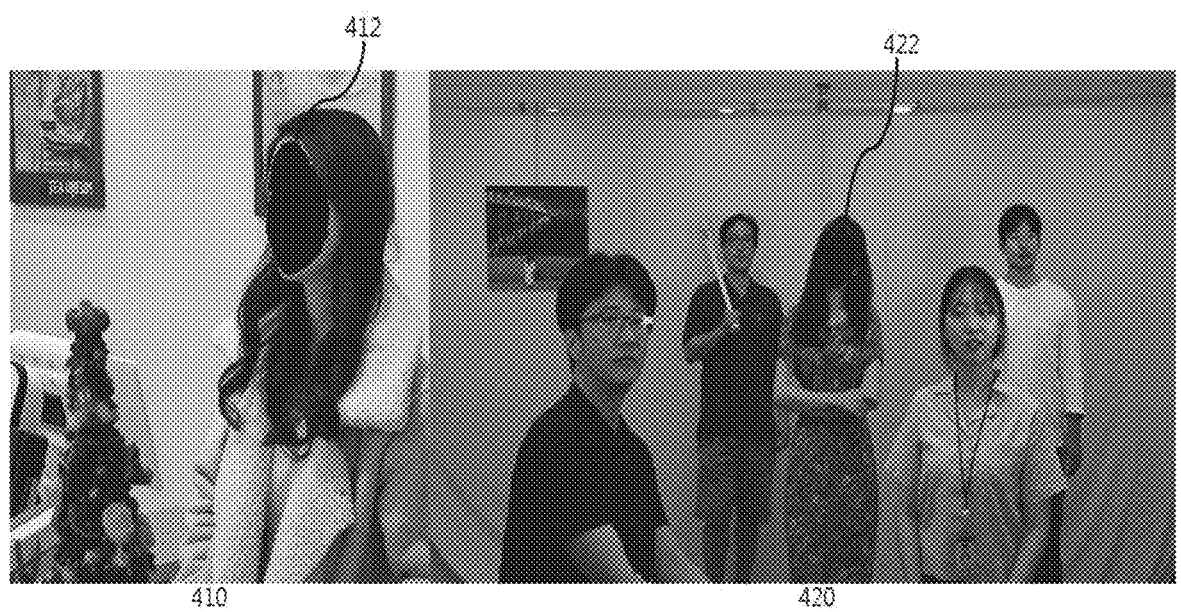
FIG. 4 is a diagram illustrating an image in which a foreground and a background are segmented using a total variation according to an embodiment of the present disclosure.

FIG. 4 is a diagram illustrating an image in which the foreground and the background are segmented using a total variation according to an embodiment of the present disclosure.

Referring to FIGS. 3 and 4, it is found that the segmentation image shown in FIG. 4 is clearer and has more noise removed than the segmentation image shown in FIG. 3. Specifically, a region 412 classified as the foreground in a first image 410 shown in FIG. 4 has more noise reduced than a region 312 classified as the foreground in a first image 310 shown in FIG. 3. Also, a region 422 classified as the foreground in a second image 420 shown in FIG. 4 has more noise reduced than a region 322 classified as the foreground in a second image 320 shown in FIG. 3.

In the apparatus or the method or both of the present disclosure, the multiplicative inverse of a distance value between the current pixel and the foreground/background pixel may be a weight factor. Also, it is possibly determined how much each foreground and background pixels influence on the foreground probability and background probability of the current pixel.

Also, in the apparatus or the method or both of the present disclosure, by using all pixels indicated as the foreground and the background in the color image by the user, the probability that the pixels which are not indicated by the user are the foreground and the background may be calculated. For example, when calculating the probability, the Gaussian model may be used. Also, in order to use the Gaussian model, the weight factor may be calculated in such a manner as to be inversely proportional to a distance between the pixel indicated by the user and the pixel not indicated. Also, in order to perform smoothing on the pixels determined as the foreground, a total variation may be finally used.

Also, in the apparatus or the method or both of the present disclosure, a weighted sum may be applied to foreground probabilities calculated from the current pixel and respective foreground pixels and background probabilities calculated from, the current pixel and respective background pixels. By applying the weighted sum, the final foreground probability and background probability may be calculated. Also, by performing normalization on the calculated final foreground probability and background probability, the final foreground probability may be determined.

According to the present disclosure, there is provided an object segmentation apparatus and method using a Gaussian mixture model and a total variation.

Also, according to the present, disclosure, there is provided an object segmentation apparatus and method based on information on a foreground and a background in a color image, which is obtained from a user, using a Gaussian model and a total variation.

Also, according to the present disclosure, there is provided an object segmentation apparatus and method of separating a foreground and a background by applying a large weight factor to similarity with the color of a foreground or background pixel close to a current pixel and applying a small weight factor to similarity with the color of the pixel far from the current pixel.

Also, according to the present disclosure, there is provided the apparatus and method of applying a total variation smoothing technique to remove noise and keeping the contour clear while providing the smooth segmentation result with respect to the remaining regions.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations.

Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, controller, a microcontroller, a microprocessor, etc.

The scope of the present disclosure includes software or machine-executable instructions (for example, operating systems (OS), applications, firmware, programs) that enable methods of various embodiments to be executed in an apparatus or on computer, and a non-transitory computer-readable medium storing such software or machine-executable instructions so that the software or instructions can be executed in an apparatus or on a computer.

What is claimed is:

1. An object segmentation method comprising:
   receiving an input image;
   receiving a user input indicating at least one piece of information on a foreground region and a background region included in the input image;
   generating at least one among a foreground pixel list and a background pixel list using the received user input;
   calculating Gaussian distribution of at least one pixel that makes up the input image using at least one among the generated foreground pixel list and background pixel list; and
   determining whether the at least one pixel is a foreground pixel or a background pixel using the calculated Gaussian distribution,
   wherein the determining of whether the at least one pixel is the foreground pixel or the background pixel comprises: calculating a foreground probability or a background probability of at least one pixel that is not included in the foreground pixel list and the background pixel list,
   wherein the foreground probability is subjected to a predetermined weight factor inversely proportional to a distance between a pixel included in the foreground pixel list and the at least one pixel that is not included in the foreground pixel list and the background pixel list, and
   wherein the background probability is subjected to a predetermined weight factor inversely proportional to a distance between a pixel included in the background pixel list and the at least one pixel that is not included in the foreground pixel list and the background pixel list.

2. The method of claim 1, further comprising:
   finally determining whether the at least one pixel is the foreground pixel or the background pixel by performing total variation smoothing on at least one pixel that is determined as the foreground pixel or the background pixel.

3. The method of claim 1, wherein the user input comprises at least one among information on touching a display unit, which displays the input image, and coordinate information on a predetermined pixel in the input image.

4. The method of claim 1, wherein the foreground pixel list comprises at least one among coordinates, a brightness value, and a color value of at least one pixel indicated as the foreground region by the user input, and the background pixel list comprises at least one among coordinates, a brightness value, and a color value of at least one pixel indicated as the background region by the user input.

5. The method of claim 1, wherein the calculating of the Gaussian distribution of the at least one pixel that makes up the input, image comprises: calculating the Gaussian distribution of the at least one pixel included in one of the foreground pixel list and the background pixel list.

6. The method of claim 5, wherein at the calculating of the Gaussian distribution, the at least one pixel is used regarding an average value and all pixels included in one list, which includes the at least one pixel, between the foreground pixel list and the background pixel list are used regarding a distribution value.

7. The method of claim 1, wherein the at least one among the generated foreground pixel list and background pixel list is a list of pixels in order of the received user input.

8. An object segmentation apparatus comprising:
   a foreground/background pixel list generation unit configured to:
      receive an input image;
      receive a user input indicating at least one piece of information on a foreground region and a background region included in the input image; and
      generate at least one among a foreground pixel list and a background pixel list using the received user input; and
   a Gaussian mixture model-based foreground/background preprocessing segmentation unit configured to:
      calculate Gaussian distribution of at least one pixel that makes up the input image using at least one among the generated foreground pixel list and background pixel list;
      determine whether the at least one pixel is a foreground pixel of a background pixel using the calculated Gaussian distribution; and
      calculate a foreground probability or a background probability of at least one pixel that is not included in the foreground pixel list and the background pixel list,
      wherein the foreground probability is subjected to a predetermined weight factor inversely proportional to a distance between a pixel included in the foreground pixel list and the at least one pixel that is not included in the foreground pixel list and the background pixel list, and
      wherein the background probability is subjected to a predetermined weight factor inversely proportional to a distance between a pixel included in the background pixel list and the at least one pixel that is not included in the foreground pixel list and the background pixel list.

9. The apparatus of claim 8, further comprising: a total variation smoothing-based foreground/background final segmentation unit finally determining whether the at least one pixel the foreground pixel or the background pixel by performing total variation smoothing on at least one pixel that is determined as the foreground pixel or the background pixel.

10. The apparatus of claim 8, wherein the user input comprises at least one among information on touching a display unit, which displays the input image, and coordinate information on a predetermined pixel in the input image.

11. The apparatus of claim 8, wherein the foreground pixel list comprises at least one among coordinates, a brightness value, and a color value of at least one pixel indicated as the foreground region by the user input, and the background pixel list comprises at least one among coordinates, a brightness value, and a color value of at least one pixel indicated as the background region by the user input.

12. The apparatus of claim 8, wherein the Gaussian mixture model-based foreground/background preprocessing segmentation unit calculates the Gaussian distribution of the at least one pixel included in one of the foreground pixel list and the background pixel list.

13. The apparatus of claim 12, wherein at the calculating of the Gaussian distribution, the at least one pixel is used regarding an average value and all pixels included in one list, which includes the at least one pixel, between the foreground pixel list and the background pixel list are used regarding a distribution value.

14. The apparatus of claim 8, wherein at least one among the generated foreground pixel list and background pixel list is a list of pixels in order of the received user input.

* * * * *